US011471998B2

(12) United States Patent
Wetherell

(10) Patent No.: US 11,471,998 B2
(45) Date of Patent: Oct. 18, 2022

(54) TOOLS FOR POLISHING AND REFINISHING CONCRETE AND METHODS FOR USING THE SAME

(71) Applicant: Global Polishing Systems, LLC, Henderson, NV (US)

(72) Inventor: Mark Wetherell, Henderson, NV (US)

( * ) Notice: Subject to any disclaimer, the term of this patent is extended or adjusted under 35 U.S.C. 154(b) by 408 days.

(21) Appl. No.: 16/808,769

(22) Filed: Mar. 4, 2020

(65) Prior Publication Data

US 2020/0198091 A1 Jun. 25, 2020

Related U.S. Application Data

(63) Continuation-in-part of application No. 16/417,241, filed on May 20, 2019, which is a continuation-in-part
(Continued)

(51) Int. Cl.
*B24B 1/00* (2006.01)
*B24B 37/04* (2012.01)
(Continued)

(52) U.S. Cl.
CPC .............. *B24B 37/044* (2013.01); *B24B 1/00* (2013.01); *B24B 7/18* (2013.01); *B24B 7/186* (2013.01); *B24B 7/22* (2013.01); *B24B 7/226* (2013.01); *B28D 1/20* (2013.01); *C04B 41/009* (2013.01); *C04B 41/5089* (2013.01); *C04B 41/68* (2013.01); *C04B 41/72* (2013.01);
(Continued)

(58) Field of Classification Search
CPC .. B24B 1/00; B24B 7/18; B24B 7/186; B24B 7/22; B24B 1/007

USPC .......................... 451/41, 350, 540, 488, 548
See application file for complete search history.

(56) References Cited

U.S. PATENT DOCUMENTS 3,976,497 A 8/1976 Clark
4,098,363 A 7/1978 Rohde et al.
(Continued)

FOREIGN PATENT DOCUMENTS

JP 2004314328 11/2004
JP 2009-114047 5/2009
(Continued)

OTHER PUBLICATIONS

"Basic know-how about silica", eka Industrial Specialties—Questions and Answers, Brochure, EKA Chemical Brochure, https://web.archive.org/web/20060617043238/http://www.colloidalsilica.com/eka.asp, © Copyright 2002 Eka Chemicals, Industrial Specialties, Mar. 21, 2006, 8 pages.
(Continued)

*Primary Examiner* — Joseph J Hail
*Assistant Examiner* — Shantese L McDonald
(74) *Attorney, Agent, or Firm* — Weide & Miller, Ltd.

(57) ABSTRACT

Systems and methods for treating concrete, which includes the steps of wetting a surface of concrete with colloidal silica, allowing time for the colloidal silica to penetrate the concrete surface, and cutting the surface of the concrete with a bladed or segmented tool wherein the longitudinal blade or edge portion is positioned approximately at an angle between 30 degrees and 90 degrees relative to the surface of the concrete.

19 Claims, 8 Drawing Sheets

Related U.S. Application Data of application No. 15/592,122, filed on May 10, 2017, now Pat. No. 10,343,254, which is a continuation-in-part of application No. 14/725,292, filed on May 29, 2015, now Pat. No. 9,662,757, which is a continuation of application No. 14/171,608, filed on Feb. 3, 2014, now Pat. No. 9,073,165.

(60) Provisional application No. 61/759,879, filed on Feb. 1, 2013.

(51) Int. Cl.

| | | |
|---|---|---|
| *E04B 5/16* | (2006.01) | |
| *C04B 41/72* | (2006.01) | |
| *B24B 7/22* | (2006.01) | |
| *C04B 41/68* | (2006.01) | |
| *C04B 41/00* | (2006.01) | |
| *C04B 41/50* | (2006.01) | |
| *B24B 7/18* | (2006.01) | |
| *E04F 21/24* | (2006.01) | |
| *E04F 15/12* | (2006.01) | |
| *B28D 1/20* | (2006.01) | |

(52) U.S. Cl.
CPC ............... *E04B 5/16* (2013.01); *E04F 15/12* (2013.01); *E04F 21/24* (2013.01); *E04F 21/248* (2013.01); *B24B 1/007* (2013.01)

(56) References Cited

U.S. PATENT DOCUMENTS

| | | | |
|---|---|---|---|
| 4,232,980 A | 11/1980 | Tertinek et al. | |
| 4,303,136 A | 12/1981 | Ball | |
| 4,330,446 A | 5/1982 | Miyosawa | |
| 4,452,324 A | 6/1984 | Jurgens | |
| 4,471,845 A | 9/1984 | Jurgens | |
| 4,606,418 A | 8/1986 | Thompson | |
| 4,788,509 A | 11/1988 | Bahl et al. | |
| 4,852,671 A | 8/1989 | Southland | |
| 4,883,132 A | 11/1989 | Tibbitts | |
| 4,913,244 A | 4/1990 | Trujillo | |
| 5,355,954 A | 10/1994 | Onan et al. | |
| 5,356,671 A | 10/1994 | Drs | |
| 5,370,919 A | 12/1994 | Fieuws et al. | |
| 5,431,852 A | 7/1995 | Kaijou | |
| 5,695,811 A | 12/1997 | Andersen et al. | |
| 5,750,276 A | 5/1998 | Page | |
| 5,895,688 A | 4/1999 | Bertoncini et al. | |
| 5,945,169 A | 8/1999 | Netti et al. | |
| 6,155,907 A | 12/2000 | Jones | |
| 6,187,851 B1 | 2/2001 | Netti et al. | |
| 6,299,522 B1 * | 10/2001 | Lee | B24D 7/06 |
| | | | 451/540 |
| 6,347,456 B1 | 2/2002 | Jones et al. | |
| 6,454,632 B1 | 9/2002 | Jones et al. | |
| RE38,364 E | 12/2003 | Wetherell et al. | |
| 6,800,130 B2 | 10/2004 | Greenwood et al. | |
| 7,013,973 B2 | 3/2006 | Danican et al. | |
| 7,255,513 B2 | 8/2007 | Lampley et al. | |
| 7,357,700 B2 | 4/2008 | Lundberg | |
| 7,588,090 B2 | 9/2009 | Dairon et al. | |
| 7,737,195 B2 | 6/2010 | Gimvang | |
| 7,775,741 B2 * | 8/2010 | Copoulos | E04F 21/247 |
| | | | 404/112 |
| 8,092,588 B2 | 1/2012 | Bowers | |
| 8,251,780 B2 * | 8/2012 | Ward | B24B 7/186 |
| | | | 451/353 |
| 8,393,937 B2 | 3/2013 | Goldberg | |
| 8,460,058 B2 | 6/2013 | Yoshida et al. | |
| 8,678,883 B2 | 3/2014 | Strickland | |
| 8,852,334 B1 | 10/2014 | Hills et al. | |
| 8,999,056 B1 | 4/2015 | Hills et al. | |
| 9,272,951 B1 | 3/2016 | Hills et al. | |
| 10,322,485 B2 | 6/2019 | Hills | |
| 2004/0076470 A1 | 4/2004 | Goossens | |
| 2006/0083589 A1 | 4/2006 | McClain | |
| 2008/0019774 A1 | 1/2008 | Stenzel | |
| 2008/0081217 A1 | 4/2008 | Bowers | |
| 2009/0050018 A1 | 2/2009 | Kishimoto | |
| 2009/0110834 A1 | 4/2009 | Gimvang | |
| 2009/0142604 A1 | 6/2009 | Imai et al. | |
| 2009/0169750 A1 | 7/2009 | Wilkins et al. | |
| 2009/0221212 A1 | 9/2009 | Palushaj | |

FOREIGN PATENT DOCUMENTS

| | | |
|---|---|---|
| WO | WO 2004/035473 | 4/2004 |
| WO | WO 2013/049324 | 4/2013 |

OTHER PUBLICATIONS

"Lythic™ Solutions for Polished Concrete—The Difference in Densifiers™", Lythic™, http://the sherwoodgroup.com/websites/lythic, © 2008 Lythic Solutions, Inc., date unknown, 1 page.

"Lythic™ Solutions: Products—The Difference in Densifiers™", Lythic Solutions Products: Densifier, Protector, Cleaner, http://thesherwoodgroup.com/websites/lythic/products.html, © 2008 Lythic Solutions, Inc., date unknown, 1 page.

Steven H. Miller, "Concrete Floors make a polished presentation", Seattle Dialy Journal of Commerce, Copyright 2015 Seattle Daily Journal of Commerce, http://www.djc.com/news/co/12005499.html?action+get&id+12005499&printmode_=true, 4 pages, May 1, 2009.

Aquron 2000® Sub-surface Molecular Bonding & Waterproofing Solution Treatment for Concrete Manual, © Markham Distributing © Aquron Corporation, Apr. 2002, 20 pages.

"Colloidal Silica—Silifog®", Lab Korea, http://www.labkorea.com/products/chemical/silica/colloidalsilica.html, ESEL TechTra Inc. Copyright 1998, Oct. 18, 2004, 9 pages.

"Savvy Densifier", ATECH PLUS Concrete Solutions, Atech Solutions Pty Ltd, www.atechproducts.com.au, 2 pages.

Lythic Solutions™ Sales Sheet, "Concrete Curing Agent", Lythic Solutions, Inc., www.lythic.net, date unknown, 1 page.

"Zered Wet Resin Polishing Pad, D-series—SleepWell—PP-D", Diamond Tools from Zered, Inc. Mikury Wire, Metal Pad, Concrete Ploishing Pad, Grinding, http://www.zeredinc.com/Prodcut/ItemDetailView.aspx?ProductID=73&DirName=%20S, © Copyright 2013 Zered, Inc., printed Apr. 15, 2016, 2 pages.

NW Stone Restoration's Proposal dated Sep. 21, 2004, Invoice No. 1562 and Credit Memo No. 1580, NorthWest Stone Restoration, Inc., 3 pages.

Letter to Larry Lindland, SILCO2 International inc., www.nwstonerestoration.com, Brad Sleeper, General Manager, Sustainable Flooring Solutions, May 7, 2007, 1 page.

Invoice No. 0006218-IN to Northwest Stone Restorations from SILCO2 International, Inc., SILCO2 International, Inc., Aug. 23, 2006, 1 page.

* cited by examiner

TOOLS FOR POLISHING AND REFINISHING CONCRETE AND METHODS FOR USING THE SAME

CROSS-REFERENCE TO RELATED APPLICATIONS

This application is a continuation-in-part of U.S. application Ser. No. 16/417,241, which was filed on May 20, 2019, which application is a continuation-in-part of U.S. application Ser. No. 15/592,122 which was filed on May 10, 2017, which application is a continuation-in-part of U.S. application Ser. No. 14/725,292 which was filed on May 29, 2015, which application is a continuation of U.S. application Ser. No. 14/171,608 which was filed on Feb. 3, 2014, which application claims priority to U.S. Provisional Application No. 61/759,879 which was filed on Feb. 1, 2013. The contents of each of the aforementioned applications are hereby incorporated by reference.

TECHNICAL FIELD

The disclosed embodiments relate generally to methods and products for use in treating concrete, masonry, or stone, and, more specifically, for use in the grinding and polishing of concrete.

BACKGROUND

Concrete is a composite material generally defined as a mixture of two components: aggregates and paste. The paste, which typically includes cement, commonly Portland cement, and water, binds the aggregates (sand and gravel or crushed stone) into a rocklike mass as the paste hardens. The paste hardens because of the chemical hydration reaction between the cement and water.

Concrete surfaces have traditionally been polished using a series of finer and finer abrasives to produce a shiny, hard, durable surface. These abrasives may be attached to a machine to move them across the surface. These machines are by nature heavy and normally have a fairly rigid deck which is difficult or at least cumbersome to maneuver.

The majority of concrete slabs are not flat. As machines with fixed abrasives move across the surface, the larger sized grit abrasives extend further down into the undulations on the surface and leave scratches in the low spots. These large scratches in low spots are very difficult to remove since the abrasive on the next grit of diamond tools only extends outward about half as far as the previous diamond. It therefore cannot reach the low spot created by the previous abrasive. This issue can often result in exposing the aggregate, because as each diamond is used, it is necessary to drive it down against the surface to try to remove the scratches left from the previous tool. In order to remove these scratches in the low spots, more material must be removed from the high spots in order to reach the low spots. As stock is removed, it requires working either in dust if cutting dry or through a slurry if cutting wet. It is difficult to see what is being accomplished under either condition. If the concrete is hard and the tool being worked with is too hard to fret, then the diamonds will glaze and not remove the previous scratch. If a dry resin bonded diamonds are used, then the scratches fill with resin which comes out later. The end product of dry polished floors is a high gloss with little to no clarity in the floor and little to no long term sustainability.

It should be readily apparent from the above that the problems with the grinding and polishing processes are many and varied. Accordingly, there is a continuing need to improve upon existing concrete cutting and polishing systems and methods.

SUMMARY

In some embodiments, a cutting compound provides several advantageous in conjunction to stock removal and polishing. The cutting material acts as the abrasive so that the machine does not have to use progressive grits of diamond abrasives applied to the surface of the floor. This compound is used in conjunction with the shape and angle of the tool in order to remove material from the floor while at the same time not producing the traditional scratches. This compound is substantially neutral in pH until it has been activated by a catalyst, such as the high pH of the concrete. The particle size begins a transformation in size due to the catalyst. The benefit of this system is that it doesn't rely solely on the abrasive in the tool to create scratches, but rather, it uses the edge of the tool to literally shave the surface of the concrete to produce an end result. Since it does not create errant and erratic scratches in the floor from the shape of the tools, there are no scratches to be removed.

Some embodiments are directed to a method for grinding and polishing dried concrete, comprising the steps of: wetting a surface of dried concrete with a solution including amorphous colloidal silica; permitting the colloidal silica to penetrate the concrete surface for a period of time, cutting the surface of the concrete with a bladed or segmented tool having the blade or edge portion at an approximate angle between 30 degrees and 90 degrees relative to the surface of the concrete.

In some embodiments, wetting the surface includes soaking the surface with the amorphous colloidal silica. The method may further include the step of soaking the surface with water or an aqueous solution before wetting the surface with the amorphous colloidal silica. In some embodiments, wherein the process of cutting the surface comprises shaving and removing the surface ridges from the concrete surface. The method may further include the step of applying a densifier to the cut surface. In some embodiments, the method further includes the steps of allowing the surface to dry and applying a coloring product.

In some embodiments, the floor may be cleaned and polished over time using typical maintenance procedures. For example, a method for maintaining a concrete floor and for refinishing the concrete floor over time may comprise: (a) applying diluted colloidal silica cleaner to the concrete floor via a maintenance apparatus, (b) allowing the diluted colloidal silica cleaner to dwell on the concrete floor, (c) removing at least some of the diluted colloidal silica cleaner from the concrete floor via the typical maintenance apparatus, and (d) repeating steps (a)-(c) according to a predetermined maintenance schedule.

In some embodiments, a concentration of colloidal silica in the diluted colloidal silica cleaner is about 3/10 of 1%. The particles of the colloidal silica may have a size of about 7 nm. In some instances, the particles of the colloidal silica have a size ranging from 9 nm to 1000 nm. In other embodiments, the concentration of colloidal silica in the diluted colloidal silica cleaner ranges from 1/10 of 1% to 1%.

In some embodiments, the method may also include removing sealants from the concrete floor prior to performing steps (a)-(c). In some examples, the diluted colloidal silica cleaner may be scrubbed onto the concrete floor via a scrubbing pad driven by a scrubber driver of the maintenance apparatus. The scrubbing pad may be an abrasive pad having a grit greater than 400.

The step of allowing the diluted colloidal silica cleaner to dwell on the concrete floor may include operating the maintenance device on the concrete floor without a vacuum of the maintenance device removing the diluted colloidal silica cleaner from the concrete floor. The step of removing at least some of the diluted colloidal silica cleaner from the concrete floor may include operating the maintenance device on the concrete floor with the vacuum of the maintenance device removing the diluted colloidal silica cleaner from the concrete floor.

The step of allowing the diluted colloidal silica cleaner to dwell on the concrete floor may include allowing the diluted colloidal silica cleaner to dwell on the concrete floor for five minutes to one hour, or for ten minutes to forty minutes. Once the floor is sufficiently polished, the method may include cleaning the floor with a cleaner without colloidal silicas.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION OF EMBODIMENTS

The disclosed embodiments are directed to methods for grinding and polishing concrete, and tools and compounds for facilitating such methods.

Figure 1:
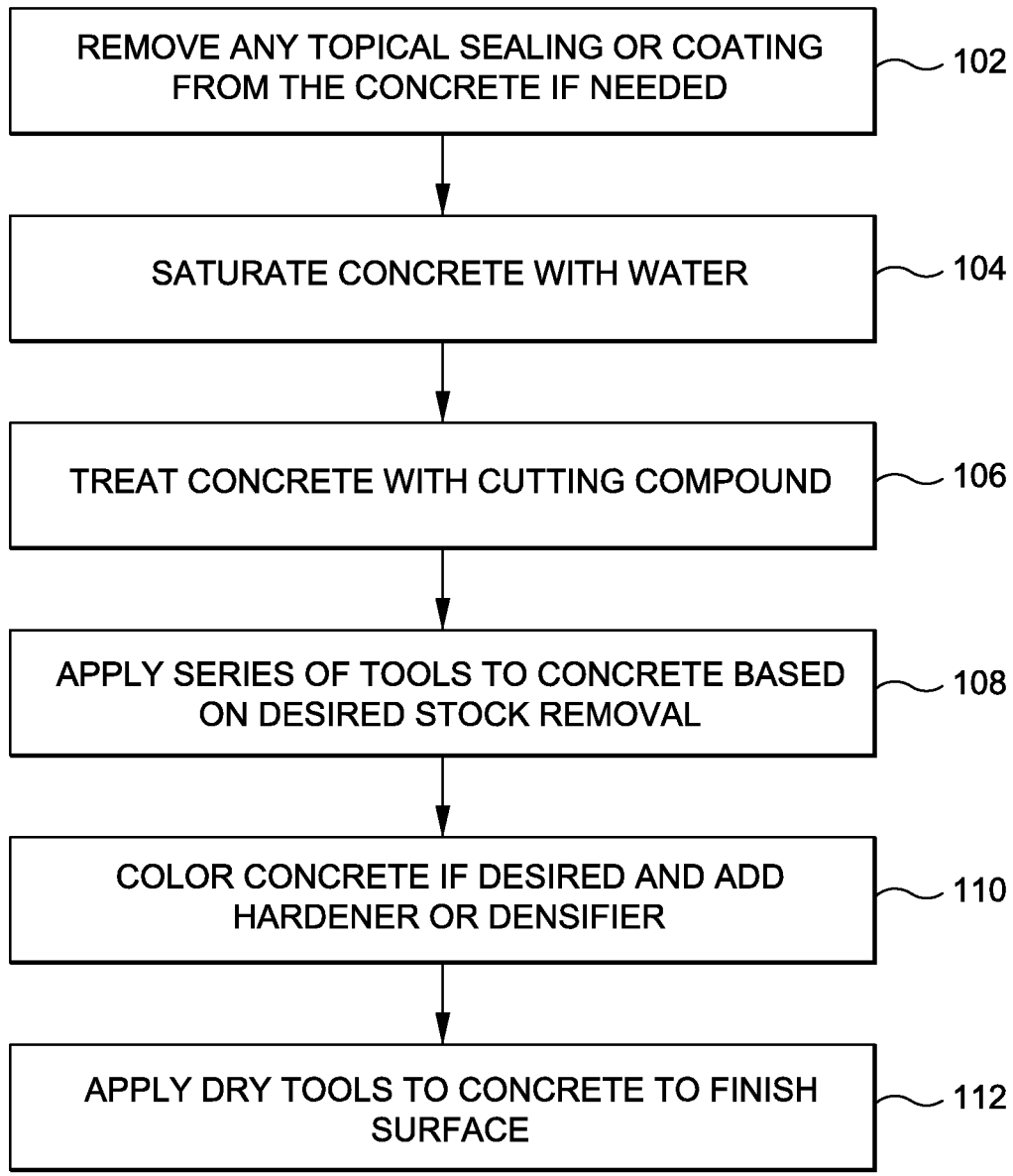
FIG. 1 is a method for finishing and/or repairing concrete, according to one exemplary embodiment.

FIG. 1 is a method for finishing and/or repairing concrete, according to one exemplary embodiment. In step 102 of FIG. 1, prior to beginning concrete finishing/repairing, any topical sealing or coating needs to be removed from the concrete. This may be done using any suitable method including mechanical methods such as grinding or sand blasting the topical coating or sealing from the surface of the concrete. Other methods including chemical methods such as chemical strippers may be used.

In step 104, the concrete is saturated with water. In the disclosed method, much a cutting during the repairing/polishing process should be performed wet. Accordingly, the surface of the concrete is saturated with water to facilitate cutting. The surface is sufficiently saturated based on the depth of cut that is desired. For example, the surface may be water saturated for as little as thirty minutes up to as long as an entire day.

After the concrete has been saturated with water, a cutting compound is applied to the concrete surface, as described in step 106. The compound which may be used according to the non-limiting exemplary methods described herein below may comprise amorphous colloidal silicas and a fluid which exhibits hydrophobic or hydrophilic properties when applied to the concrete. In some embodiments, the colloidal silicas have a particle size which ranges from about 1 to about 10 nanometers. In other embodiments, the colloidal silicas have a particle size which ranges from about 3 nm to about 9 nm. In some embodiments, the aforementioned compound further includes one or more surfactants. Other ingredients may include water, disinfectants and fragrances. In one embodiment, the compound may have a pH value that is substantially neutral without a high alkalinity. In another embodiment, the pH range of the cutting compound may range from 4 to 7. In another embodiment, the pH range of the cutting compound may range from 8 to 13.

Cured concrete may have pores in the size range of 30 nm in diameter, while the particles of the amorphous colloidal silica in solution may be about 7 nm in diameter. In this manner, the particles of the compound can penetrate the pores of the concrete. The concrete typically has larger pores in the aggregate subsurface. The silica particle sizes in some embodiments may thus range from 9 nanometers to 1000 nanometers in size, and penetrate the concrete throughout the aggregate. The solution, which may be water, carries the amorphous colloidal silica into the slab via capillary action through the larger concrete pores. After a period of dwell time, the amorphous colloidal silica has been found to penetrate to about 10 to about 12 mm into the concrete slab.

In some embodiments, other particle sizes may be used. For example, the particle sizes of the colloidal silica may be as large as 100 nm or higher. The particles within the concrete act as an abrasive during the shaving/polishing process described below. Thus, when the particles sizes are configured to be larger, more material may be easily removed during the shaving process.

In some embodiments, other compounds may be used. For example, colloidal silicates may also be used in the cutting compound. The colloidal silicates may be hydrophilic, or water soluble. When colloidal silicates that are hydrophilic are used, the silicates may form a hardened silica film on the surface of the floor. This creates a flat surface (filling voids or any remaining scratches in the concrete). The disadvantages of the silica film include that the hardened top film may be prone to detach from the concrete due to the water solubility of the film. In some embodiments, the colloidal silicates which are typically hydrophilic may be treated with organo silane or siloxane to exhibit hydrophobic properties.

Other compounds may also be used with the disclosed methods herein. Such compounds may include organic or inorganic compounds of silicon, including silicates, siliconates, fluorosilicates, siloxanes, silazanes, halosilanes or combinations thereof. These elements may be provided in a solution of liquid. These compounds may be provided individually or in combination in any ratio or concentration.

The cutting compound described herein may be applied by scrubbing the compound into the floor via a manual, automatic, or semi-automatic scrubber. This helps the compound to penetrate the concrete. The scrubbing process additionally agitates the compound to activate the product to being to break up the cement. The compound applied to the concrete may be allowed to soak for a period of time, such as thirty minutes.

After wetting the concrete slab with the solution containing one embodiment of the above-described cutting compounds, the method then includes the step of "shaving" the concrete by applying one or more tools to the concrete based on the desired amount of stock to be removed, as shown in step 108 of FIG. 1. The term shaving is given is ordinary meaning in the art, namely removing a top layer while minimizing scratching, tearing, or otherwise breaking apart the remaining surface and underlying material.

Figure 2:
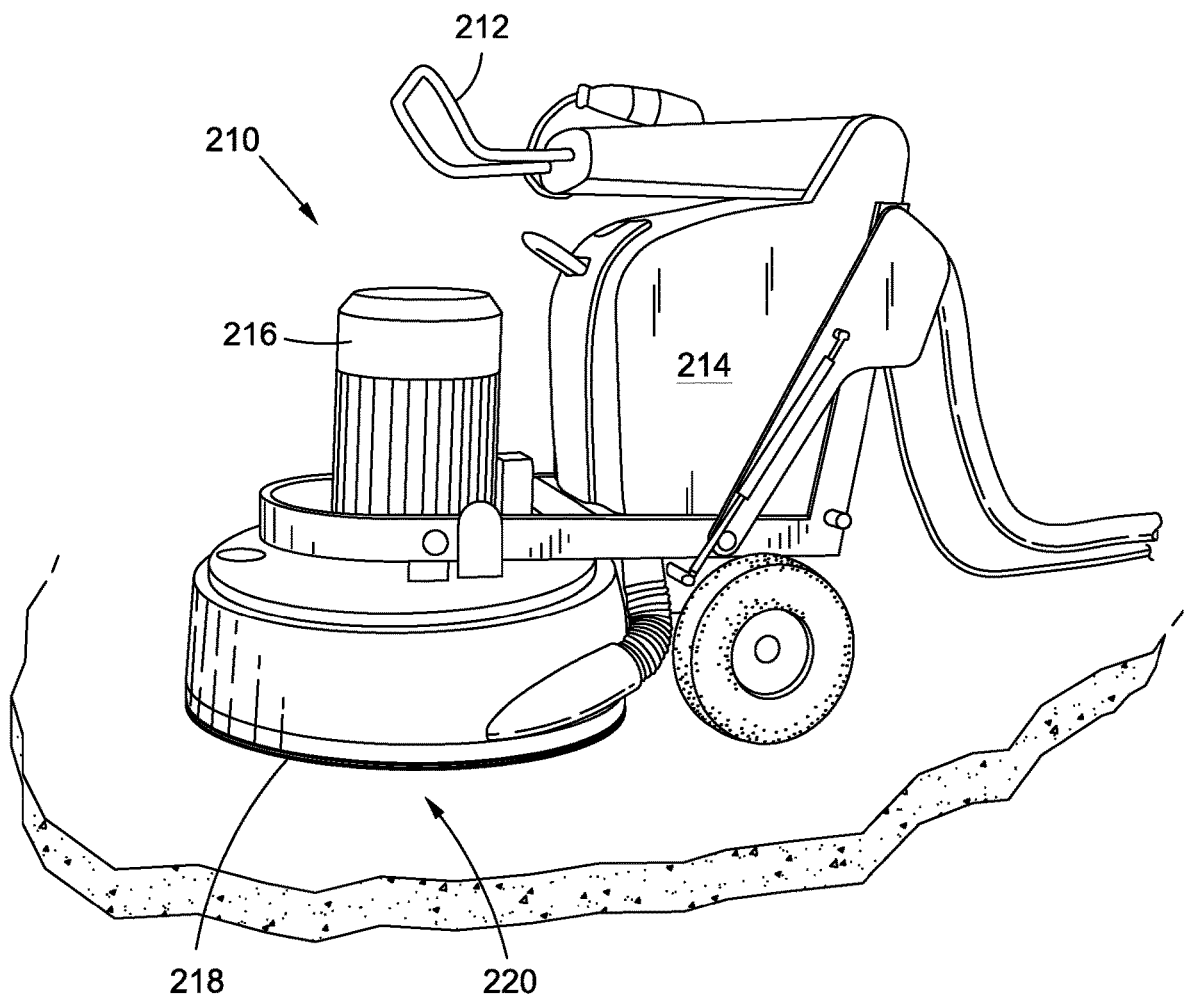
FIG. 2 shows an exemplary machine for applying tools to the surface of the concrete.

FIG. 2 shows an exemplary machine for applying tools to the surface of the concrete. In FIG. 2, the machine 210 for applying tools to the surface is illustrated as walk-behind type machine, however other similar machines such as ride-on or remotely controlled machines may also be used. The machine 210 comprises a housing assembly 214 that is coupled to and extends from a handle 212. The housing assembly 214 and the handle 212 provide the main structure of the machine 210. The handle 212 may include controls for the operation of a motor 216 which propels a drive mechanism 218. The drive mechanism supports a resurfacing tool disposed on the bottom 220 of the machine 210, which will be described in more detail below. The handle 212 also aids in supporting a user during operation of the machine 210.

The housing assembly 214 is the main unit that provides structural support for the machine 210 components and provides protection and air flow during operation of the machine 210. The housing 214 supports the motor 216 positioned on the housing assembly 214 and includes a drive mechanism 218 connected to the motor 216. The motor 216 may be any form of motor that provides mechanical force to the drive mechanism 218. The motor 216 may be an internal combustion engine, an electric motor, or a pneumatic motor. The drive mechanism 218 is configured to provide rotational motion and extends downward from the motor 216 and into the housing assembly 214. The drive mechanism 218 may include such components such as rods, rotational joints, bearings, and one or more belts to drive the cutting tool.

The tool blade or edge of the disclosed embodiments is configured with a blade or edge such that it removes "peaks" of the material without affecting the "valleys" of the material, thus polishing and evening the surface of the material, such as concrete. In traditional methods, tools are used that become round and deformed by the material, such as concrete. In the example of cutting concrete, the sand, aggregate, and fiber in the concrete are harder than the bond of traditional tools. As a result, traditional methods rely exclusively on the diamond face of the tool. Thus traditionally, the focus of the tool was on the diamond face abrasive. In the present embodiment, the cutting compound keeps the edge of the tool at a desired profile, shape, angle, or pitch, and thus the cut may be more accurately controlled.

The application of the tool also applies pressure to the solution wetting the concrete surface as described above, which further facilitates driving the amorphous colloidal silica deeper into the slab. It has been found that the amorphous colloidal silica will penetrate as much as 18 mm into the concrete slab with the application of pressure.

Once into the slab, the amorphous silica has been found to crosslink with the lime, Portland cement, calcium hydroxide, portlandite, silica, sodium silicate and any other high pH compounds it encounters in the slab, thus hardening the slab. In addition, the amorphous silica will link with the concrete shavings and dust, thus reducing dust in the atmosphere while also further hardening the concrete slab.

The blade or edge of a tool is applied to the surface of the wetted concrete slab at an angle, which may be from about 1 degrees to about 90 degrees relative to the plane of the surface, but is preferably between 30 degrees and 50 degrees relative to the plane of the surface. It has been found that by implementing various shapes or edge profiles on the leading edge of the tool, the type of cut, the depth of cut, and the primary surface texture of the concrete slab resulting from the cut can be controlled. This contrasts with traditional prior art abrasive cutting tools that operate primarily by abrasives within the tool that scratch against the surface. The scratching may occur randomly as the abrasive is randomly located in a pad, and the machine may move the pad in a random or orbital pattern. Thus, in traditional methods, a series of finer and finer abrasives must be used in succession to achieve a desired result. In contrast, as few tools as a single tool can be used to remove as much stock from the floor as needed by using the shaving process described herein.

Figure 7:
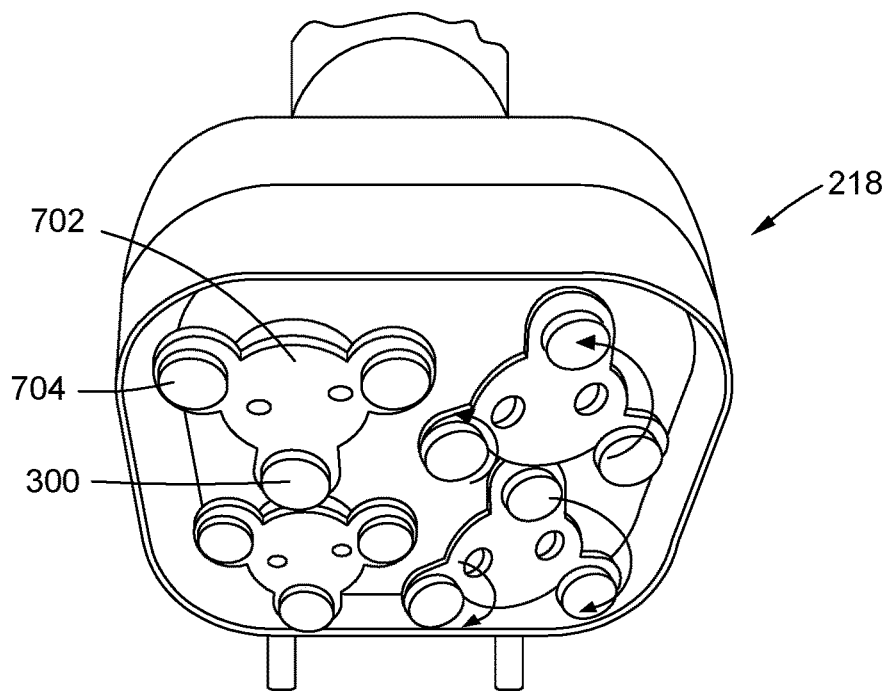
FIG. 7 shows an exemplary drive mechanism for a machine for applying tools to the surface of the concrete.

FIG. 7 shows an exemplary drive mechanism for a machine for applying tools to the surface of the concrete. Here the drive mechanism 218 comprises several rotary heads 702. Each rotary head 702 is configured to rotate about a central axis. The rotary heads 702 comprise multiple tool attachment mounts 704. Each attachment mount 704 is also configured to rotate. A tool 300 may be attached to each of the attachment mounts 704 to be applied to the concrete. The tool 300 is discussed below.

Figure 3:
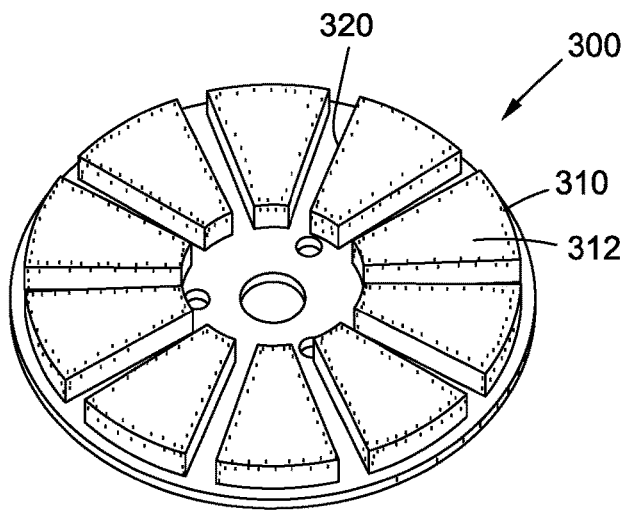
FIG. 3 is a tool for cutting, repairing, and/or polishing concrete, according to an exemplary embodiment.
Figure 4A:
FIG. 4A, FIG. 4B, FIG. 4C, FIG. 4E, and FIG. 4F show exemplary tool elements with exemplary tool edges.
Figure 4A:
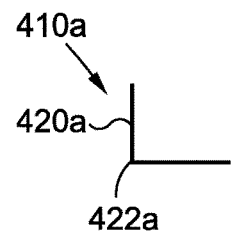
Figure 4B:
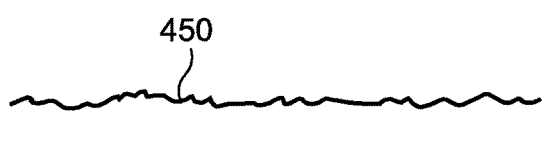
Figure 4B:
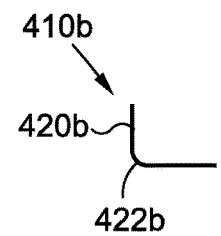
Figure 4C:
Figure 4C:
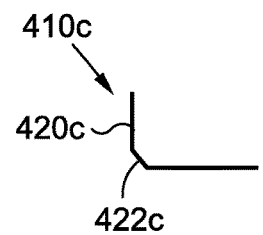
Figure 4D:
Figure 4D:
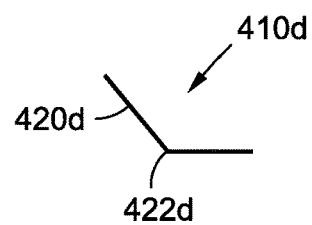
Figure 4E:
Figure 4E:
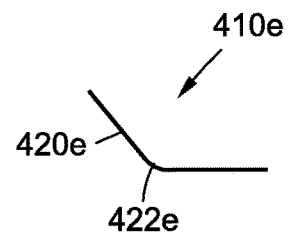
Figure 4F:
Figure 4F:
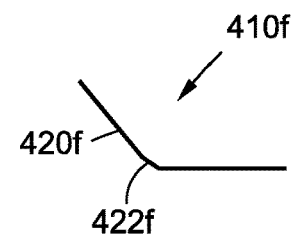

An exemplary tool is shown in FIG. 3. In FIG. 3, a tool 300 comprises several tooling elements 310 comprising an abrasive body 312 and a leading edge 320. In FIG. 3, the tooling elements 310 are shown in a trapezoidal shape, though any number of other shapes may be used, such as rectangular, triangular, circular, etc. The tool may be connected to a machine, such as the machine 210 shown in FIG. 2, to move the tool 300 relative to the concrete surface.

FIG. 4A-FIG. 4F show exemplary tool elements with tool edges. In one example, a tooling element 410 a may comprise a leading edge 420 a at a 90-degree angle from the concrete surface 450. The leading edge 420a may include a sharp tooling surface 422a. In other embodiments, tooling elements 410b, 410c have leading edges 412b, 412c with tooling surfaces 422b, 422c that have a radiused edge and a chamfered edge, respectively. In further embodiments, tooling elements 410d, 410e, 410f have leading edges 412d, 412e, 412f that are at an angle other than 90 degrees from the surface 450 of the concrete.

By controlling the angle, chamfer, or radius of the tool edge, the primary surface texture and the amount of material removed may be controlled. In one example, a sharp, 90-degree tool results in a cut that gouges and fractures the concrete as is passes over the concrete. A radiused edge is configured to cut without gouging. A chamfered edge at 45 degrees from the surface performs a cut that does not gouge as it cuts the surface of the concrete. Other more aggressive shapes may include a trapezoid shaped tool with 90-degree edges all around the tool. Tools with different edges may be formed to also include abrasive materials to control a secondary surface texture and surface removal. Further, it has also been found that abrasives may be removed from the tooling elements, such as diamond abrasives, without decreasing the effectiveness of the tool when the leading edge of the tool is shaped as discussed herein.

The tools may be constructed based on the type of edge desired as well as according to the desired application. For example, the tool may be formed of a metal via powder metallurgy techniques where the powder is impregnated with diamond abrasives. In other embodiments, a metal tool may be formed through forging or casting methods. Other materials may also be used such as ceramic tools or resin-based tools including resins impregnated with metals.

As opposed to traditional abrasive tools used in the industry, it does not matter if a 30-grit tool or a 400-grit tool is used, and no progressive use of grits is needed to achieve a desired amount of stock removal. In traditional tools, the tool functions mainly through the abrasives that are encapsulated in the bond of the tool. Thus, the tool only creates scratches into the surface that are the size of the abrasive. For example, a 30-grit tool will only create a 30-grit scratch. Once the tool achieves a consistent 30-grit scratch it will not remove any more material. Further, when the tool is not exposing fresh material, then the surface heats causing the tool to glaze and not take any more material from the surface. With the cutting compound and bladed or segmented tool disclosed herein, material removal is controlled by the leading edge of the tool and not the abrasives embedded therein, allowing for a more predictable and controlled finish of the cut and/or polish. Further, because the stock removal is not based on the grit of the tool, fewer tool passes are needed to remove the desired amount of stock, cutting costs and increasing efficiency.

The amount of stock removal may further be controlled by other factors such as the weight of the machine to which the tool is attached. The speed of the machine may also be optimized for a desired amount of stock removal with the tool.

If heavy aggregate exposure is desired, then starting with a metal bonded rectangular tool is appropriate. If a surface cream polish is desired, then starting with a chamfered ceramic tool or flexible semimetal tool is appropriate. The angle that the tool addresses the surface of the concrete will determine the amount of material that is removed. Once a starting tool is selected, an appropriate sequence of tools is used to achieve the desired results. For heavy stock removal, such as for large aggregate exposure, a tool that has a 90-degree edge to the tool such as a tool shaped with rectangles, squares, straight edge, rhombus, or any metal bonded tool where the edge comes straight down and the face on the floor creates a 90-degree edge is appropriate. For moderate stock removal, a tool that has a rounded edge on the outside of the tool and a 90-degree edge on the inside of the tool is appropriate. The rounded edge does not gouge the surface and the 90-degree interior edge still removes a significant amount of stock. For light stock removal, a chamfered edge of less than 90 degrees is appropriate. An interior edge of 90 is still acceptable but not necessary.

As one example of a traditional tool sequence relying on abrasives for removing material, the first tool might be a 6-grit metal bonded tool. This is followed with tools that double the grit each pass. Such a succession of tools might include metal bonded 16-grit, 24-30 grit, 50-70 grit, 100-grit, 100 grit semimetal, 200-grit resin, 400-grit, 800-grit, and 1600-grit. In contrast, using the disclosed method, a maximum of four tools may be used achieving the same result. For example, the first tool might be a 6-grit tool with a trapezoidal shaped 90-degree edge; which is followed by a 100-grit, a 10 segment tool with a radiused edge; a 400-grit semi-metal tool; and last an 800-grit dry or wet polish. Other grits and tool edges may be used depending on the amount of the aggregate that is intended to be exposed during the polishing/resurfacing process. For example, if less material is to be removed, three tools starting with the 100-grit, 10-segment may be used. Thus, as compared to traditional methods, labor may be reduced by a minimum of 50%.

Further, the resulting surface finishing will be of a higher quality than those made using traditional methods.

Figure 8A:
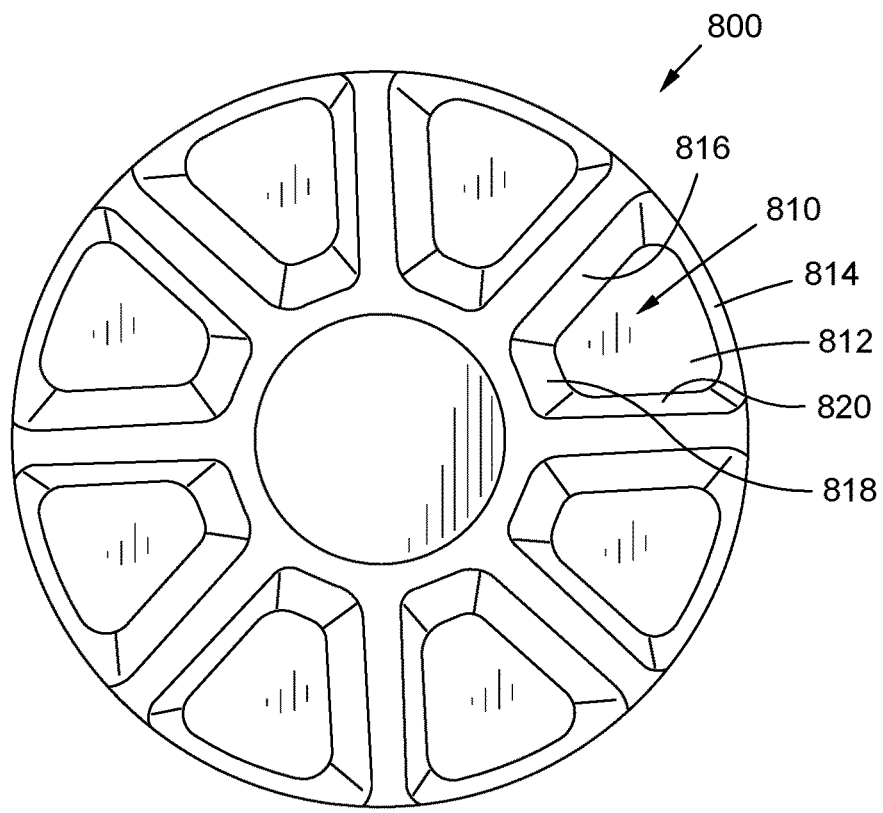
FIG. 8A shows a bottom view of an exemplary tool with multiple edge profiles.
Figure 8B:
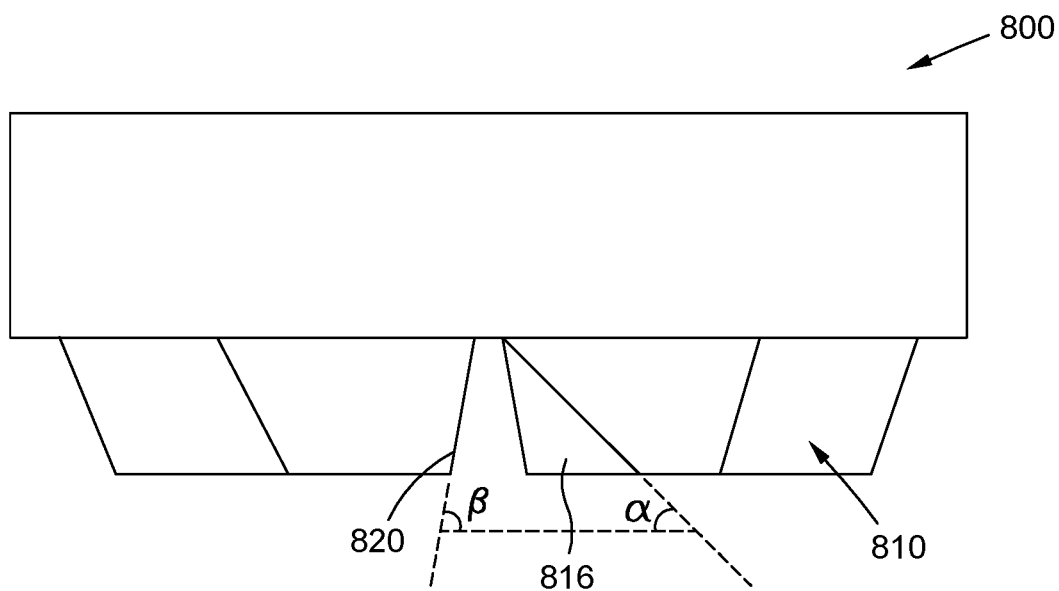
FIG. 8B is a side view of the tool shown in FIG. 8A.
Figure 8C:
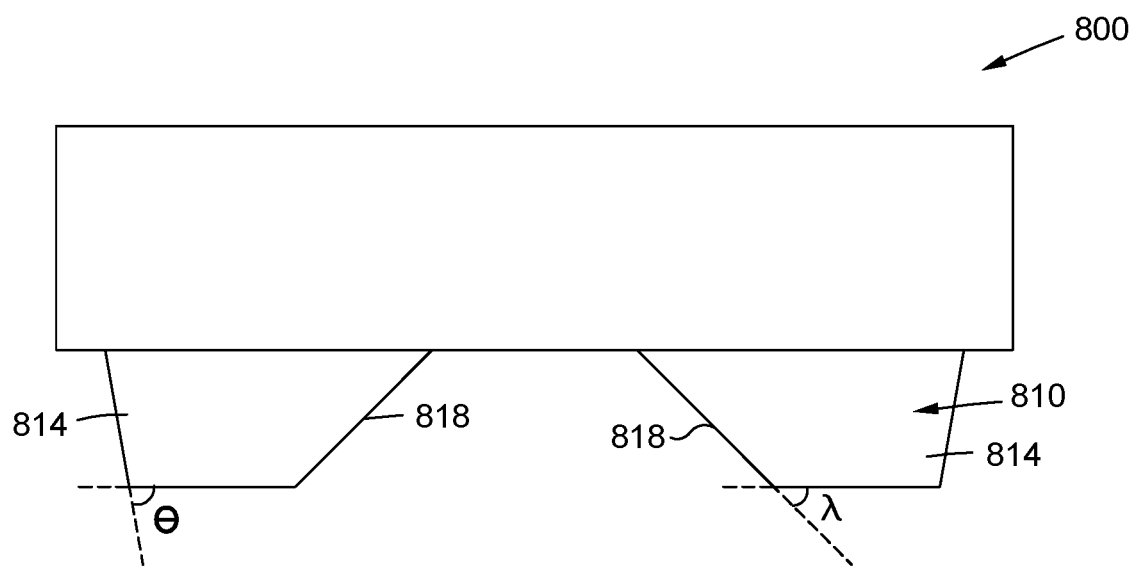
FIG. 8C is a cross section view of the tool shown in FIG. 8A.

An exemplary tool utilizing different edges is shown in FIGS. 8A-8C. A tool 800 comprises a plurality of tooling elements 810. Each tooling element 810 projects from the tool and has a top surface 812, an outside surface 814, a rear surface 816, an inner surface 818, and a front surface 820. The tool 800 may be formed from a metal, and may optionally have diamonds embedded in the top surface 812 to facilitate removal of material.

In this example, the angles at which each of the outside, rear, inside, and front surfaces 814, 816, 818, 820 are set to achieve both removal of material and polishing simultaneously. It has been found that a tool edge having a 90-degree angle or a near 90-degree angle relative to the surface of the concrete is efficient for removing material from the concrete. It has also been found that a tool edge with a smaller angle relative to the concrete creates a polishing affect as less material is removed.

Accordingly, the tool 800 has surfaces that both remove material and that polish the floor. FIG. 8B shows a side view of the tool 800 and particularly shows angles of a front edge 820 and a rear edge 816 of a tool elements 810 of the tool 800. In this example, a rear edge 816 may be at an angle $\alpha$ between 35 and 55 degrees, and more specifically in this embodiment the angle $\alpha$ may be around 45 degrees relative to the concrete surface. The front edge 820 may be at an angle $\beta$ between 70 and 90 degrees, and more specifically in this embodiment the angle $\beta$ may be around 80 degrees relative to the surface.

FIG. 8C shows a cross-section view of the tool 800 and particularly shows angles of the outside surface 814 and the inner surface 818. Here an angle $\theta$ of the outside surface 814 with respect to the concrete surface is between 70 and 90 degrees. More specifically, the angle $\theta$ is around 80 degrees. The angle $\lambda$ of the inner surface 818 with respect to the concrete surface is between 35 and 55 degrees with respect to the concrete surface. More specifically, the angle $\lambda$ is about 45 degrees.

Multiple tools 800 may be placed on the machine 210 for applying tools to a surface. When the tools 800 are mounted to the attachment mounts 704 of the rotary heads 702, the tools 800 may spin in different directions. In this manner, some of the tools 800 will spin such that the front surface 820 is the leading edge of the tool 800, while others of the tools 800 will spin such that the rear surface 816 is the leading edge of the tool 800. In this manner, a single tool type (tool 800) may be used both to remove material (e.g. with the front surface 820) and to polish the surface of the concrete (e.g. with the rear surface 816). The amount of material removed during the cutting step (step 108 of FIG. 1) may depend upon the type of finish desired. For example, no aggregate exposure will require one series of tools, salt and pepper aggregate exposure will require a second series of tools, and large aggregate exposure will require a third series of tools.

Traditional methods require hard, medium, and soft bonds to effectively remove stock, which require knowledge of the hardness of the slab in order to properly pick the proper tool to do the work. Hard bonded tools are required for soft concrete and soft bonded tools are required for hard concrete. If a hard-bonded tool is used on hard concrete, then the tool will glaze and will not work. Also, if the tool runs too fast, then it will heat up and glaze. If a soft tool is run on soft concrete, then it will wear out very quickly. With the cutting compound used in the disclosed embodiments, it is not necessary to know the hardness of the concrete. It is not as important to know the hardness of the concrete in the first steps. It is not necessary to use a soft bonded tool. This contrasts with using dry tools (such as in the polishing step described below) where it is imperative to know the hardness of the concrete because such tools, for example resin tools, are susceptible to glazing.

The bladed or segmented tool in combination with the cutting compound can be used on both a new concrete slab and an existing concrete slab. The cutting compound penetrates the surface of either the new or existing concrete slab, and the cutting tool shaves layers of concrete from the slab to remove surface impurities or surface defects and create a new hardened surface. New concrete may be defined as freshly placed concrete. Existing, or dried concrete may be defined as concrete that has been allowed to cure for 72 hours or greater.

In some embodiments, a portion of the removed concrete mixes with the cutting compound, such as the colloidal silica, and forms a slurry that bonds back to the surface of the concrete. Thus, the methods described herein are not only used to grind and polish concrete, but also to refinish the surface of an imperfect or damaged slab of concrete. In some embodiments, cement, such as Portland cement, may be added to the slurry during refinishing for situations where damage to the slab, such as rain damage, has washed away or damaged some or all of the existing cement from the slab. In one example, Portland cement may be applied to the surface of the concrete and mixed with the cutting compound and/or slurry to fill in defects or otherwise repair damage to the concrete.

The cutting compound reduces the labor required to grind or polish the floor. Because the tools are configured such that the leading edge essentially shaves layers of the concrete off the top rather than scratching the concrete via an abrasive, a smooth surface can be created in very few passes. This is because the tools only remove the "peaks" in the surface of the concrete while leaving the "valleys" or creating much smaller "valleys." Traditional methods require a diamond abrasive tool used in succession where the next tool used has a diamond abrasive that is half as large as the previous diamond. These abrasives, unlike the presently disclosed tools that shave only peaks of the concrete, introduce new valleys into the surface. The diamond abrasive rips and fractures the surface of the concrete, because it is harder than the material that it is cutting. The result is an increase in the concentration of fractured aggregate and subsequent roll out from the polished surface. The surface eventually becomes more uniform as the abrasives become smaller, but this requires many passes with tools having incrementally smaller and smaller abrasives. Thus, the prior art methods are more labor intensive and require more material costs due to the use of more power or fuel to power the machine and numerous prior art polishing pads are consumed during use.

Returning to FIG. 1, after the series of tools has been applied to achieve the desired stock removal and initial surface finish, a coloring agent may be added to the concrete if desired, and a hardener or densifier is applied, as shown in step 110. Color may be added to the concrete using a coloring product as described herein. In some embodiments, the coloring product includes the materials as shown in Table 1.

TABLE 1

| Ingredient | % | CAS # | OSHA | ACGIH | OTHER |
| --- | --- | --- | --- | --- | --- |
| Silica, amorphous, precipitated | 10-15% | 7631-86-9 | 80 mg/M$^3$/ % SiO$_2$ | | 10 ppm |
| 2-Butoxyethanol | | 111-76-2 | 50 ppm | 20 ppm | N/A |
| Glycol Ether DB | | 112-34-5 | 50 ppm | 20 ppm | N/A |
| Glycol Ether EP | | 2807-30-9 | Not Established | Not Established | |
| propan-2-ol | 5-7% | 67-63-0 | 400 ppm | 400 ppm | |
| Cr (III) (complexed in dye | 2-5% | 7440-47-3 | 0.5 mg/m$^3$ | 0.5 mg/m$^3$ | |
| Water | 60-70% | 7732-18-5 | Not Established | Not Established | N/A |

Coloring products, such as those described herein, can be used with any carrier to impart color into concrete, such as water, acetone, or chemical densifiers. In some embodiments, the coloring may be added along with the densifier in step 110 of FIG. 1. In other embodiments, the color may be added along with the cutting compound in step 106 of FIG. 1. One advantage of a coloring product used with the cutting compound described herein is that it may be 100% miscible and hydrophilic. If there is water in the slab, which is quite common, then the other materials that use a salt as a pigment are pushed out of the slab. If the relative humidity of the air is lower than the relative humidity of the slab, then the moisture will leave the slab and move into the air. If a pigment has been used to color the slab it will leave with the water. Another advantage to the coloring products used with the cutting compound is that they can be driven along with the ilica of the compound into the concrete. This is because the silica is porous and clear, the coloring product colors the silica, and the silica penetrates the slab. The depth of penetration can be as much as about 10 mm to about 12 mm into the concrete slab, but may be greater. A non-limiting exemplary method of use of the coloring product is described as follows:

1. Cut until floor is smooth. Two passes with a head speed of 3-400 rps is sufficient.
2. Apply the coloring product at a rate of 400 square feet per gallon. The floor should preferably be dry prior to application of this material.
3. Apply a low pH colloidal chemical hardener to the floor at 400-600 square feet per gallon, leaving the product on the floor for at least 30 minutes.

Once the hardener or densifier has been applied along with any desired color, dry tools are applied to the concrete to complete the finish of the concrete surface as shown in step 112 of FIG. 1. The cutting compound will not easily cut after it has dried into the concrete. It will however polish. In one embodiment, the surface may be dry polished using an800-grit tool. In another embodiment, the dry polish may be completed with a 1500 grit phenolic resin tool.

Once the process is complete, the surface may be scrubbed and cleaned if necessary, and optionally sealed. A colloidal silica sealer for stained and polished concrete may be used in one embodiment. More than one coat of sealer may need to be applied. A silica blended guard mixed with water at a rate of 500-2000 square feet per gallons may be used being applied with a typical garden sprayer and a microfiber applicator. The entire process may be completed by burnishing the floor with a hog's hair or black pad.

In some embodiments, a dry resin may be applied as the last step to produce a high polish and to seal the surface. The seal of the surface may then be tested by applying water to the floor and letting it sit for approximately three minutes. If the area occupied by water becomes darker, then the water has penetrated the area.

It has been found that the above-described surfacing method (using the cutting compound with tools that take advantage of the leading edge) provides a higher quality finish that traditional methods for at least two reasons. First, when the tool cuts along the surface of the concrete, the tool does not fracture the aggregate. In other words, the tool can cleanly cut through the concrete without introducing new gouges or valleys into the concrete. Second, the tool can cut through both the cement and the aggregate at the same rate, because the primary abrasive is contained in the cutting compound. The compound fills the valleys in the surface only allowing the peaks to be shaved by the edge of the tool. Since the size of the particles are substantially uniform, the amount of fill across the voids is also uniform. The amorphous silica provides the abrasives to remove the aggregate, but the abrasives are free floating in the compound as opposed to being fixed within a tool. Thus, the abrasives do not produce any particular pattern. When the abrasive moves across a surface it does not fracture the cement and aggregate. The tool is harder than the surface of the slab so it cuts it. The pores of the concrete are supported by the amorphous silica; therefore the concrete is prevented from breaking down during the cutting process. The combination of these effects results in a superior finish than compared with traditional surfacing methods.

Because of the ability to cleanly shave off the surface without fracturing the aggregate, the method described herein may be used to flatten existing concrete. This flattening process may be used without removing a large amount of material. This is because the process can shave off high areas without introducing new holes or valleys into other areas of the concrete. Using the edge of the tool as described herein, a high grit tool, such as an 800-grit metal tool may be used to flatten the surface. In other words, the shaving and cutting performed by the disclosed embodiments is shaving the material from the top down rather than scratching and fracturing the surface with incrementally finer grit tools.

By using the above method, an auditable roughness average (RA) of the surface of the concrete may be obtained. In prior methods, resin based tools leave a film on the surface of the concrete, so the RA of the concrete itself is indeterminable. A further drawback of the prior art is that the resin can interfere with or block subsequent sealing, coloring, or other such surface treatments. The resin can also cause glazing and cracking which degrades the surface finish and polish level. However, by the present methods, an RA of 6 or less may be achieved. In some embodiments, an RA of less than 1 may be achieved. The surface of the concrete also has a relatively high distinction of image reading and a low haze reading. For example, the method has been found to achieve a distinction of image reading of up to 100% and a haze reading in the low single digits.

The cutting compound does not require a heavy piece of equipment to remove significant amounts of stock from the slab. The cutting compound is more effective than water at maintaining a wet surface to facilitate cutting. That is, the compound penetrates deeper into the concrete than water and does not dry out as quickly as water. Because the concrete better maintains this "wet" condition with the cutting compound, the concrete can be cut more easily. Surface temperatures are also reduced and thus the tool abrasives do not glaze.

Figure 5:
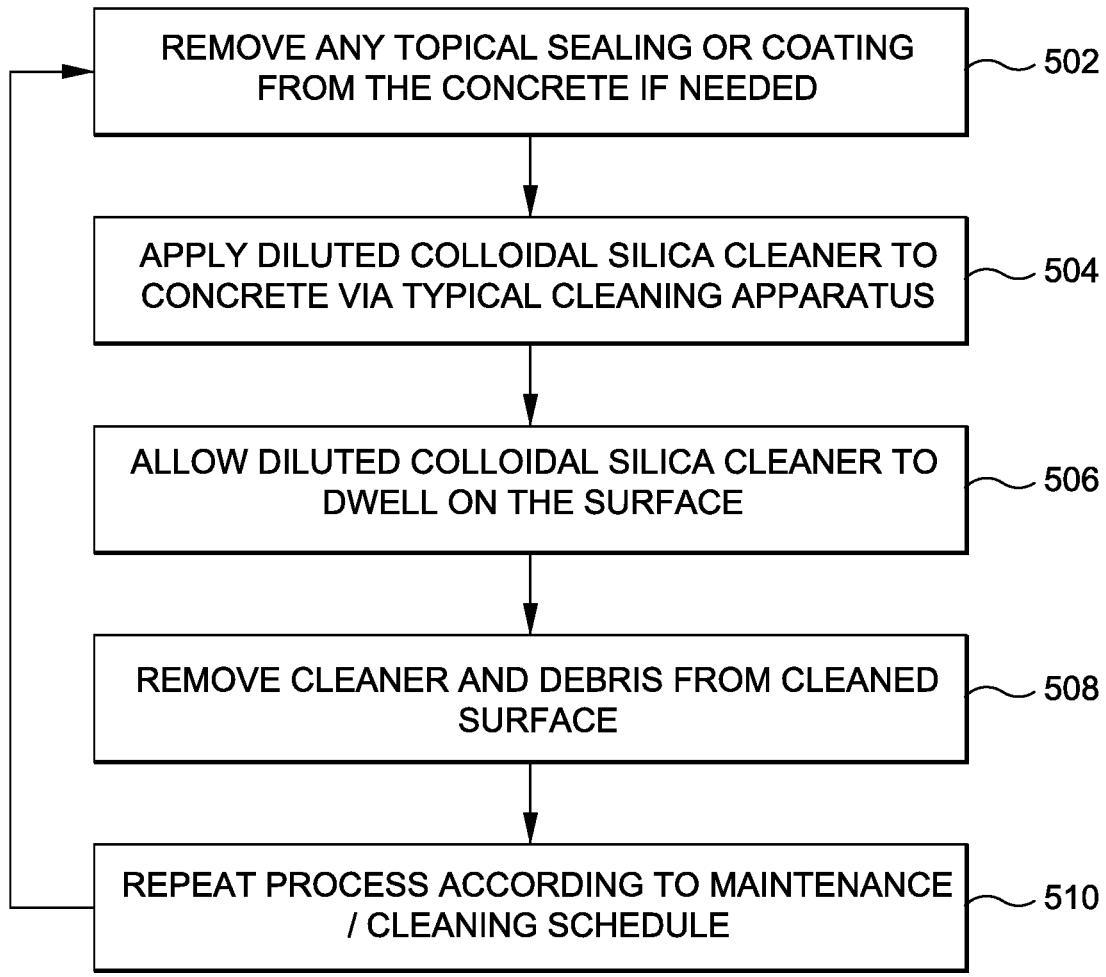
FIG. 5 shows a method for polishing a concrete surface according to another exemplary embodiment.

FIG. 5 shows a method for polishing a concrete surface according to another exemplary embodiment. It has been found that an effective smoothing and polishing of a concrete surface may be achieved over time using unskilled labor by using the colloidal silica cutting compound mentioned above in a diluted form. More specifically, a diluted colloidal silica as part of a floor cleaning product may be used by maintenance or custodial personnel to smooth and polish a concrete floor.

In step 502, topical seals or coating are removed from the concrete floor as needed. The smoothing and polishing process using the diluted colloidal silica may remove some sealants on its own, however, other sealants may need to be removed before beginning the polishing process. In one example, floors with an epoxy coating must have the epoxy coating removed prior to beginning the polishing process. On the other hand, acrylic coatings do not need to be removed separately because such coatings will be removed during the polishing process.

In step 504, the diluted colloidal silica cleaner is applied to the concrete via typical cleaning/maintenance processes. One key advantage of the present method is that unskilled maintenance/custodial personnel may perform the method without any extra training or equipment. By using the colloidal silica in the cleaner, the maintenance/custodial personnel can accomplish the polishing in the same manner as they would normally clean a floor, such as after business hours. This allows the floor to remain in commission during the polishing process, unlike the cutting and polishing process described above which requires skilled labor, requires a large amount a stock removal from the floor, and requires that the floor or area be unavailable during the work.

Figure 6A:
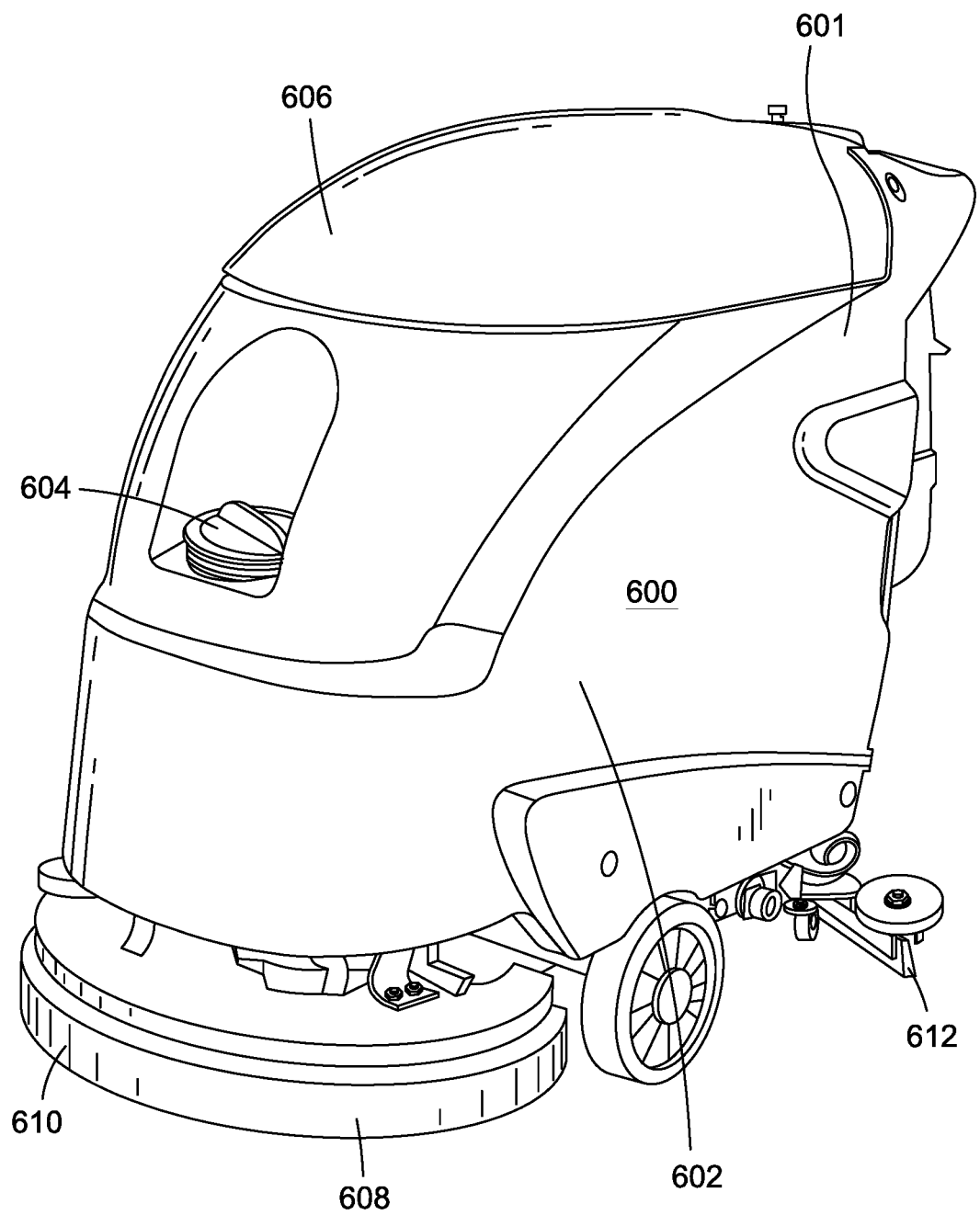
FIGS. 6A & 6B show an exemplary floor maintenance and cleaning machine, according to an exemplary embodiment.
Figure 6B:
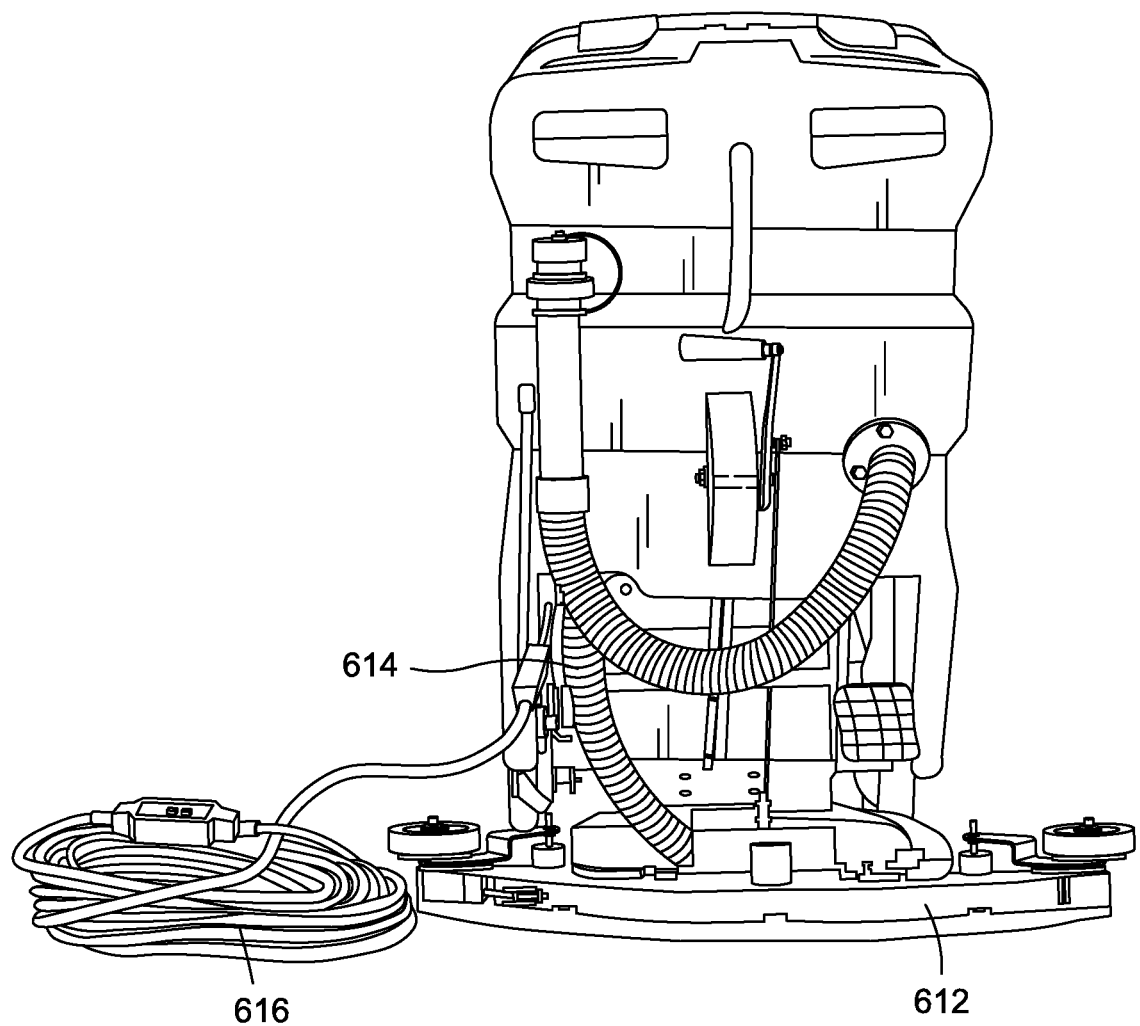

For example, the diluted colloidal silica cleaning solution may be applied by an auto scrubber machine. An example of an auto scrubber machine is shown in FIGS. 6A and 6B. An auto scrubber machine 600 may include a housing 601 formed from a durable material such as plastic. The housing 601 may have solution tank 602 in which a cleaning solution may be poured. In the present application, a diluted colloidal silica cleaning solution may be used. The tank 602 is accessed via a tank cap 604. The housing 601 also has a recovery tank 606.

At the bottom of the housing 601, there is a scrubber driver 608. The scrubber driver 608 may optionally have a rubber skirt 610 as shown. At the rear of the auto scrubber machine 600, there is a squeegee assembly 612. The squeegee assembly 612 directs debris loosened by the scrubber 600 to a vacuum hose 614 that directs the debris to the recovery tank 606. The auto scrubber 600 may be powered via a power cord 616. However, in other embodiments, the auto scrubber 600 may have a battery to provide power to the device.

The auto scrubber 600 further comprises solution emitters (not shown) that dispense the solution stored in the tank 602 to the floor. The solution is scrubbed onto the floor via a scrubbing pad driven by the scrubber driver 608.

In this embodiment, the diluted colloidal silica is suspended in the cleaning solution. The concentration of the colloidal silica may be around 3/10 of 1%, and may range from 1/10 of 1% to 1% concentration. In other embodiments, the concentration of colloidal silica may be as much as 20%. The cleaning solution may further comprise wetting agents, surfactants, and leveling agents.

The scrubbing pad used during the process may be typical pad used in the industry such as abrasive pad having a grit greater than 400. Examples of such scrubbing pads may include a scrubbing pad such as a Scotch-Brite® pad, a diamond impregnated resin pad such as those offered by Diamabrush™, or other pads typically used for maintenance or polishing a floor.

The scrubbing pad on the auto scrubber 600 in combination with the abrasive nature of the colloidal silica suspended in the cleaning solution serve to remove debris from the surface of the floor as well as to polish the floor. The colloidal silica is hydrophilic and is drawn into the floor via capillary action in the concrete. The colloidal silica bonds with high alkaline material, such as concrete, and thus the colloidal silica bonds with the cement within the pores of the cement, strengthening the surface of the floor.

Returning to FIG. 5, in step 506, the diluted colloidal silica is allowed to dwell on the surface. For example, the operator of the auto scrubber 600 may make a first pass over the floor without the vacuum removing the diluted colloidal silica cleaner from the floor. This allows the colloidal silica to penetrate into the pores of the concrete. During the second pass, the auto scrubber 600 may operate with the vacuum to remove loosened debris, as noted in step 508.

The dwell time may vary based on the size of the floor to be cleaned. The dwell time may be at least five minutes may be as long as an hour. More preferably, the dwell time may be between ten and forty minutes.

In step 510, the process is repeated according to a predetermined maintenance schedule. For example, the process may be done during a daily/nightly floor cleaning performed by maintenance/custodial personnel. In other embodiments, the process may be completed every other day, three times a week, or at any desired interval according to the needs of a facility.

Through the repeated cleaning/polishing using the diluted colloidal silica cleaning solution, the floor is slowly polished, sealed, and hardened over a period of time. This essentially can restore a concrete floor using unskilled labor during maintenance processes that are likely already ongoing at a facility.

The process according to the embodiments disclosed herein have several advantages. For example, the floor can be restored, polished, sealed, and hardened using unskilled labor without the need for aggressive tooling for stock removal. That is, the only tools required are those typically considered polishing tools having a grit greater than 400. However, even when using high grit tools, sufficient material can be removed for floor restoration due to the abrasive nature of the colloidal silica in the solution.

The floor is polished and hardened through the reaction of the colloidal silica with the cement in the pores of the concrete. The colloidal silica penetrates the pores of the concrete and reacts with the cement. Over multiple iterations of the process, the colloidal silica "fills" the pores on the cement, sealing the surface and creating a flat, polished floor.

Furthermore, the colloidal silica in reaction with the cement, such as Portland cement, hardens the surface of the floor. After thirty or sixty days (depending on frequency of the cleaning schedule and the tools used), the Mohs hardness of the floor has been found to be in excess of 9. This is in comparison to typical concrete hardness ranging from about a 3 to a 7 based on the aggregate in a particular geographic area. The clarity of the floor is further enhanced to be equal to that of a floor restored using skilled labor and low grit tools.

The floor restoration and polishing may also be completed without taking a facility out of operation. Typical restoration processes require highly skill labor and aggressive, low-grit cutting tools. This necessitates the working area of the facility to be shut down during the restoration process. However, with the present method, the restoration and polishing of the floor is done by maintenance personnel over the course of normal custodial operations. This reduces down time for facilities. Further because there is no training involved or the need for skilled labor, the cost of the floor restoration is reduced dramatically.

The proposed method also cleans floors much more effectively than traditional cleaning methods. In testing of the above described methods, it was noted that the water, solution, and debris collected by the auto scrubber during the first few days of the process has a black color to the extent that it is opaque. However, by the end of the first week, the collected water becomes a light grey. By the end of the second week, the water picked up by the auto scrubber is clear.

It has been found that during the first few applications, the process is removing material and dirt from the surface of the concrete due to the abrasive nature of the colloidal silica in combination with the fine grit tool. As the process continues, less and less dirt and material are removed as the colloidal silica fills the pores of the concrete, thereby sealing and hardening the floor of the concrete. After sufficient applications, dirt can no longer penetrate the concrete, and the floor is hardened and polished to the point that no further material is removed.

In contrast, soaps and detergents leave a residue on the concrete. This residue attracts dirt and traps it to the floor. This can accelerate the wear of the concrete. With the above described system, no film or residue is produced, and the floor is sealed from dirt penetration.

Once the floor is sufficiently hardened, a separate cleaner without colloidal silica may be used. Such cleaners may be a non-fortified cleaner that does not damage the floor or create a residue on the floor. This is because once the floor is sealed, no additional silicas penetrate the floor. This may result in a fine dust on the floor after it dries. Thus, a cleaner without colloidal silicas is used after the floor is polished.

It will be appreciated by those skilled in the art that while the systems and methods have been described above in connection with particular embodiments and examples, the invention is not necessarily so limited, and that numerous other embodiments, examples, uses, modifications and departures from such embodiments, examples and uses are all intended to be encompassed by the spirit and scope of the invention as described herein and would be understood to one of ordinary skill in the art.

What is claimed is:

1. A tool for finishing or refinishing a concrete surface, the tool comprising:
   at least one tooling element projecting from the tool, the tooling element having a front edge, a rear edge, an inner edge, an outer edge, and a top surface, the front edge being angled between 75 and 85 degrees relative to the concrete surface, the rear edge being angled between 30 and 50 degrees relative to the concrete surface, wherein when the tool is rotated in a first direction such that the front edge is a leading edge, the tool removes material from the concrete surface, and wherein when the tool is rotated in a second direction opposite the first direction such that the rear edge is a leading edge, the tool polishes the concrete surface.

2. The tool of claim 1, wherein the outer edge is angled between 75 and 85 degrees relative to the concrete surface.

3. The tool of claim 2, wherein the inner edge is angled between 30 and 50 degrees relative to the concrete surface.

4. The tool of claim 1, wherein the front edge is angled at 80 degrees relative to the concrete surface.

5. The tool of claim 4, wherein the rear edge is angled at 45 degrees relative to the concrete surface.

6. The tool of claim 1, wherein the top surface comprises diamond abrasives embedded therein.

7. A method for finishing or refinishing a concrete surface, the method comprising:
   installing at least one tool onto a respective tool mount of a drive mechanism of a machine, the tool comprising at least one tooling element projecting from the tool, the tooling element having a front edge, a rear edge, an inner edge, an outer edge, and a top surface, the front edge being angled between 75 and 85 degrees relative to the concrete surface, the rear edge being angled between 30 and 50 degrees relative to the concrete surface,
   applying the tool to the concrete surface via the machine, wherein when the tool is rotated in a first direction such that the front edge is a leading edge, the tool removes material from the concrete surface, and wherein when the tool is rotated in a second direction opposite the first direction such that the rear edge is a leading edge, the tool polishes the concrete surface.

8. The method of claim 7, wherein the at least one tool comprises a first tool and a second tool, wherein the first tool is installed to rotate in the first direction and the second tool is installed to rotate in the second direction, and wherein the first tool and the second tool are applied to the concrete surface simultaneously.

9. The method of claim 7, further comprising:
   prior to the applying step, saturating the concrete surface with water, and wetting the concrete surface with a cutting compound, the cutting compound comprising particles that penetrate pores in the concrete surface.

10. The method of claim 9, further comprising removing a sealant or coating from the concrete surface prior to saturating the concrete surface with water.

11. The method of claim 9, further comprising adding a coloring agent and a densifier after the step of applying at least one tool to the surface of the concrete.

12. The method of claim 9, wherein the cutting compound comprises a colloidal silica.

13. The method of claim 12, wherein the particles of the colloidal silica have a size of about 7 nm.

14. The method of claim 12, wherein the particles of the colloidal silica have a size ranging from 9 nm to 1000 nm.

15. The method of claim 7, wherein the outer edge is angled between 75 and 85 degrees relative to the concrete surface.

16. The method of claim 15, wherein the inner edge is angled between 30 and 50 degrees relative to the concrete surface.

17. The method of claim 7, wherein the front edge is angled at 80 degrees relative to the concrete surface.

18. The method of claim 17, wherein the rear edge is angled at 45 degrees relative to the concrete surface.

19. The method of claim 7, wherein the top surface comprises diamond abrasives embedded therein.

* * * * *